(12) United States Patent
Nguyen

(10) Patent No.: US 7,286,513 B2
(45) Date of Patent: Oct. 23, 2007

(54) WIRELESS SWITCH FOR USE IN WIRELESS COMMUNICATIONS

(75) Inventor: Hung Nguyen, Milpitas, CA (US)

(73) Assignee: Sigma Designs, Inc., Milpitas, CA (US)

( * ) Notice: Subject to any disclaimer, the term of this patent is extended or adjusted under 35 U.S.C. 154(b) by 1004 days.

(21) Appl. No.: 10/449,630

(22) Filed: May 30, 2003

(65) Prior Publication Data

US 2003/0227914 A1    Dec. 11, 2003

Related U.S. Application Data

(60) Provisional application No. 60/386,048, filed on Jun. 5, 2002.

(51) Int. Cl.
*H04J 1/16* (2006.01)
*H04J 3/14* (2006.01)

(52) U.S. Cl. ............ 370/338; 370/386; 370/400; 375/146; 375/148; 455/562.1

(58) Field of Classification Search ............ None
See application file for complete search history.

(56) References Cited

U.S. PATENT DOCUMENTS

| 6,374,124 B1 | 4/2002 | Slabinski |
| 6,404,803 B1 | 6/2002 | Wang et al. |
| 6,434,375 B1 | 8/2002 | Chulajata et al. |
| 6,483,459 B1 | 11/2002 | Hou et al. |
| 6,587,451 B1 | 7/2003 | Kwon et al. |
| 6,650,881 B1 | 11/2003 | Dogan |
| 6,771,933 B1 | 8/2004 | Eng et al. |
| 6,785,558 B1 | 8/2004 | Stratford et al. |
| 6,850,510 B2 * | 2/2005 | Kubler et al. ............ 370/338 |
| 7,099,295 B1 * | 8/2006 | Doyle et al. ............ 370/338 |
| 7,106,715 B1 * | 9/2006 | Kelton et al. ............ 370/338 |
| 2002/0054574 A1 * | 5/2002 | Beach et al. ............ 370/279 |
| 2002/0181428 A1 * | 12/2002 | Kruys ............ 370/338 |
| 2003/0174681 A1 * | 9/2003 | Gilberton et al. ............ 370/338 |
| 2003/0202497 A1 * | 10/2003 | Csapo ............ 370/338 |
| 2004/0151150 A1 * | 8/2004 | Kubler et al. ............ 370/338 |
| 2005/0254475 A1 * | 11/2005 | Kubler et al. ............ 370/338 |

* cited by examiner

*Primary Examiner*—Chirag G. Shah
(74) *Attorney, Agent, or Firm*—Thelen Reid Brown Raysman & Steiner

(57) ABSTRACT

The present invention is related to a switch for use in wireless communication systems. In one embodiment, the switch can concurrently process data from multiple mobile stations and supports full duplex, i.e., allowing receiving and transmitting data at the same time. The switch can concurrently communicate with other switches and/or mobile stations in the basic service set (BSS) of that switch. A switch may be considered an access point commonly used in other approaches. However, systems using the switch do not need to use an Ethernet switch commonly found in WLAN communication systems that use access points. Switches may be set up in a master-slave scheme wherein a master switch communicates with its slave switches, and slave switches communicate with one another through the master switch. If the data is for a mobile station in the same BSS of the switch, then, via a switch controller, the switch passes the data from the receiving path to the transmitting path. As a result, the data does not have to travel out of the switch and then back to the same switch again.

13 Claims, 8 Drawing Sheets

| Address | Port Number | Quality of Service | Signature | Weight ID |
|---------|-------------|--------------------|-----------|-----------|
| 0001    | 2           | Voice              | S1        | W1        |
| 0010    | 3           | Data               | S2        | W2        |
| 0011    | 1           | Multi-Media        | S3        | W3        |

FIG. 6

WIRELESS SWITCH FOR USE IN WIRELESS COMMUNICATIONS

RELATED APPLICATION

This application is related to and incorporates by reference co-pending patent application Ser. No. 10/079,751, entitled "Transferring Data In A Wireless Communication System," filed Feb. 22, 2002, by the same inventor and applicant Hung Nguyen.

This application also claims benefits of provisional application Ser. No. 60/386,048, entitled "Wireless Switch," filed Jun. 5, 2002, by the same inventor and applicant Hung Nguyen.

FIELD OF THE INVENTION

The present invention relates generally to wireless communications, and more specifically to a wireless switch for use in such communications.

BACKGROUND OF THE INVENTION

Wireless Local Area Networks (WLANs) commonly use access points for transmitting data between the network and mobile stations such as laptops, personal digital assistance (PDAs), cellular phones, etc. However, a WLAN system that uses the IEEE 802.11b protocol affords only three sets of access points for three distinct frequencies because that protocol allows only three non-overlapping channels or three different carrier frequencies that all access points in a system may use. Consequently, a first set of access points use a first frequency. A second set of access points use a second frequency, and a third set of access points uses a third frequency. Because access points using the same frequency may interfere with one another, to avoid interference, those access points must be placed outside the coverage range of one another. As a result, access points in the first set that uses the first frequency must be placed outside the coverage range of one another. Access points in the second set that uses the second frequency must be placed outside the coverage range of one another, and access points in the third set that uses the third frequency must be placed outside the coverage range of one another, etc.

Access points using the IEEE 802.11 protocol also have limited coverage ranges, e.g., 15 meters for the 802.11a protocol or 100 meters for the 802.11b protocol. Therefore, covering a large area requires many access points. Additionally, the more mobile stations that try to communicate with an access point, the smaller the bandwidth each mobile station can afford. In general, it is very difficult for a mobile station in a basic service set (BSS) of an access point to communicate with another mobile station in the BSS of another access point.

A WLAN system further requires an Ethernet switch that uses the IEEE 802.3 Ethernet protocol, which differs from the IEEE 802.11 wireless protocol. Therefore, mechanisms to convert data between the two protocols must be employed. Even though the Ethernet switch uses multiple physical lines for multiple channels, it cannot process data concurrently received from multiple channels or multiple mobile stations. In many situations, data sent from a source mobile station to a destination mobile station travels through an access point, through the Ethernet switch, then back through the same access point. This results in inefficiency and delays.

Networks using the CSMA/CD protocol allow only half duplex, i.e., either transmitting or receiving data at a time. Networks using the 802.11 protocol and the CSMA/CA have similar disadvantages. An access point cannot concurrently process data for multiple mobile stations. Each mobile station time-shares the same medium having the same frequency carrier.

Because of the above-mentioned deficiencies, what is needed is mechanisms to solve those deficiencies and related issues.

SUMMARY OF THE INVENTION

The present invention is related to a switch for use in wireless communication systems. In one embodiment, the switch can concurrently process data from multiple mobile stations and supports full duplex, i.e., allowing receiving and transmitting data at the same time. The switch can concurrently communicate with other switches and/or with mobile stations in the BSS of that switch. A switch may be considered an access point commonly used in other approaches. However, systems using switches in accordance with embodiments of the invention do not need to use an Ethernet switch commonly used in those approaches. Further, those switches may be set up in a master-slave scheme wherein a master switch communicates with its slave switches, and slave switches communicate with one another through the master switch. If the data is for a mobile station in the same basic service set (BSS) of the switch, then, via a switch controller, the switch passes the data from the receiving path to the transmitting path. As a result, the data does not have to travel out of the switch and then back to the same switch again.

BRIEF DESCRIPTIONS OF THE DRAWINGS

FIG. 6 shows a lookup table of a switch in FIG. 1, in accordance with one embodiment;

DETAILED DESCRIPTION OF THE INVENTION

Overview

Figure 1:
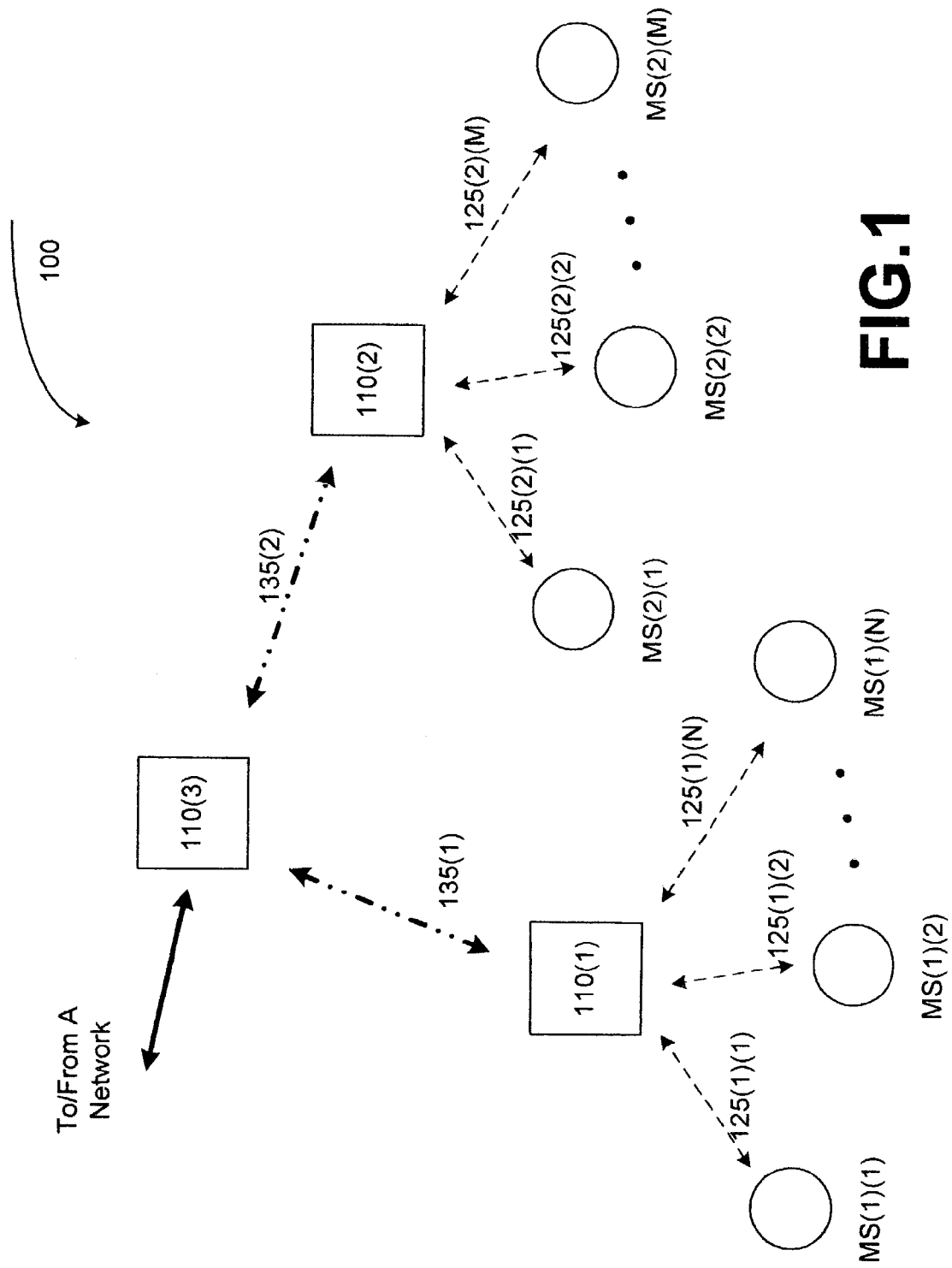
FIG. 1 shows a wireless network upon which embodiments of the invention may be implemented.

FIG. 1 shows a network 100 using switches 110 upon which embodiments of the invention may be implemented. For illustration purposes, FIG. 1 shows three switches 110(1), 110(2) and 110(3), and two types of beams, e.g., switch-to-station beams 125 and switch-to-switch beams 135. A switch 110 may be referred to as a wireless local area network (WLAN) switch because the switch may allow communications with a local area network (LAN, not shown). Depending on implementations, a switch 110 may be connected via a physical wire to the network. Further, the switch 110 does not require an Ethernet switch like other approaches to connect with the network. In general, a beam carries data in the form of electromagnetic waves generated by antennas.

A switch-to-station beam 125 allows communications between a switch 110 and a mobile station, e.g., MS(1), MS(2), etc. Generally, because a beam 125 can focus to a particular mobile station, beams 125 increase coverage range for a switch 110 to communicate with its mobile stations. A mobile station can communicate with a switch 110 as long as that mobile station is in the coverage range of a beam 125.

A switch-to-switch beam 135 allows communications between switches 110. FIG. 1 shows that beams 135(1) and 135(2) allow communications between switches 110(1) and 110(3), and between switches 110(2) and 110(3), respectively. A beam 135 normally covers a wider range than a beam 125 does. Like a beam 125, a beam 135 can focus to a particular object, e.g., a switch 110, and therefore increase coverage range for switches 110. A switch 110 may communicate with another switch 110 as long as both switches 110 are in the coverage range of a beam 135. In various embodiments, both beams 125 and 135 are compliant with the IEEE 802.11 standard. Switch-to-switch beams and switch-to-station beams are used for illustration purposes, but they carry similar characteristics and are comparable.

Generally, each beam, e.g., 125 or 135, is associated with a distinct set of weights and may cover more than one mobile station and/or switch. A beam is generated based on a signature. Mobile stations in different signature groups can concurrently transfer data between a switch 110 via beams each corresponding to a signature group. To avoid interference, mobile stations that are in the same signature group are generally scheduled by a switch 110 to transfer data in different time frames. When a switch 110 transmits data to a mobile station, the switch, based on a signature of that mobile station, sends a beam corresponding to that signature. Similarly, when a first switch transmits data to a second switch, the first switch, based on a signature of the second switch, sends a beam corresponding to that signature.

A switch 110 may be comparable an access point commonly used in other approaches. A switch 110 that independently uses switch-to-switch beams 135 and switch-to-station beams 125 allows concurrent communications between that switch 110 and other switches 110, and between that switch 110 and mobile stations in the basic service set (BSS) of that switch. Because each switch 110 uses separate switch-to-station beams to communicate with mobile stations in its corresponding BSS, each switch 110 may concurrently communicate with various mobile stations, and therefore increase the bandwidth of network 100. Compared to other approaches, a switch 110 also acts in place of an Ethernet switch that routes signals from access points to networks or to other access points. A switch 110 performs switching in layer two of the network protocol.

Multiple mobile stations using beams 125 may concurrently communicate with a switch 110, and, generally, a mobile station communicating with a switch 110 is in the basis service set of that switch 110. In FIG. 1, mobile stations MS(1)(1) to MS(1)(N) may concurrently communicate with switch 110(1). Similarly, mobile stations MS(2)(1) to MS(2)(M) may concurrently communicate with switch 110(2). Because a switch 110 can receive and transmit data at the same time, a switch 110 and/or network 100 is said to have full duplex capacity. In various embodiments, a switch 110 uses the Space Division Multiple Access (SDMA) protocol to allow multiple mobile stations to concurrently communicate with that switch 110.

A switch 110 having a beam 125 focused to a particular mobile station isolates noise and prevents interference in transmitting data for multiple mobile stations because at the time of communications to those mobile stations, each beam is separate and unique for a particular mobile station. A switch 110 may route the received data to outside switch 10 or send the data from the receiving path to the transmitting path in the same switch 110.

Switches 110 may directly communicate with one another or may be set up in a master-slave scheme in which a master switch communicates with its slave switches and slave switches communicate with one another through the master switch. For example, switch 110(3) is the master for switch 110(1) and switch 110(2), and each switch 110(1) and 110(2) may serve as a master switch for other slave switches, which are not shown. In contrast, each of switches 110(1) and 110(2) is a slave to master switch 110(3) and communicates with one another via master switch 110(3). Switch 110(3), as a master switch, communicates directly with a network, such as a LAN, and transfers data between such network and mobile stations 110(2) and 110(2). If the network is a LAN, then network 100 may be referred to as a wireless LAN (WLAN). As a master switch, switch 110(3) may treat switches 110(1) and 110(2) as its mobile stations and thus add their addresses to its lookup table as appropriate. However, switches 110(1) and 110(2), even being treated as a mobile station, generally remain stable at one particular location, and consequently, switch 110(3) does not readapt the coefficient weights for switches 110(1) and 110(2) as often as a mobile station. However, when a switch 110(1) or 110(2) changes its position, then switch 110(3) adapts to the new location of switch 110(1) and 110(2). Examples of technologies covered by embodiments of switches 110 include 802.11a, 802.11b, 802.11g, home RF, etc.

Figure 2:
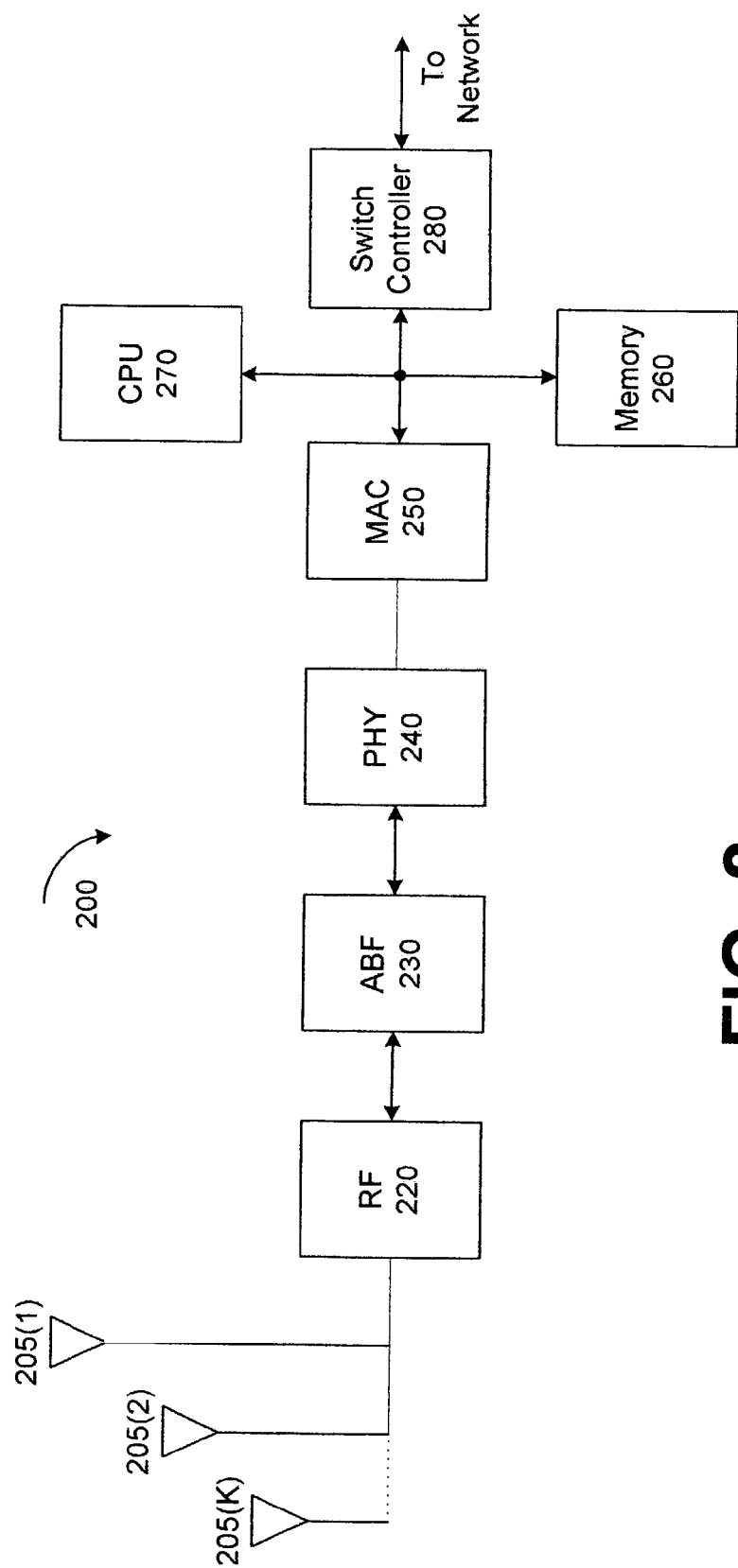
FIG. 2 shows a system using a switch in FIG. 1, in accordance with one embodiment.

FIG. 2 shows a system 200 using a switch 110, in accordance with one embodiment. Depending on implementations, ABF 230, PHY 240, MAC 250, and switch controller 280 may be considered part of a switch 110. Alternatively, a switch 110 may include one or more additional elements such as RF unit 220, memory 260, CPU 270, etc. Elements in system 200 generally include intelligent logic and/or firmware to perform their corresponding functions.

Antennas 205 allow data to be transferred between switches 110 and/or between switches 110 and their corresponding mobile stations. Each antenna 205 is connected to an RF sub unit of a RF unit 220. Typically, in Adaptive Beam Forming techniques, K antennas allow up to K beams for concurrently communicating with one to K mobile stations. For example, five antennas may form five beams to concurrently serve from one to five mobile stations.

An RF unit 220 includes at least one RF sub unit, each of which carries a plurality of antennas. RF sub units in an RF unit 220 may be connected in parallel, in series, or in a combination of parallel and series. One embodiment of RF unit 220 is disclosed in the above co-pending patent application. A plurality of sub units RF may be connected in series before interfacing with a switch 110. Alternatively, each RF sub unit may directly interface with a switch 110. The invention is not limited to how RF sub units connect to one another or to other components. In one embodiment, RF unit 220, in the receiving mode, serializes multiple sets of data into one combined set running at a frequency faster than the frequency of each set. For example, if there are four sets of data corresponding to four mobile stations, and each data set runs at 10 Mhz, then RF unit 220 serializes the four sets of data into one set running 40 Mhz. In the transmitting mode, RF unit 220 de-serializes the combined set running at 40 MHZ into four sets each running at 10 MhZ. This concept of serializing and/or de-serializing the data is applicable in the PHY, the MAC, and other areas of switch 110 as desired, and is described in the above co-pending application, in accordance with one embodiment. Further, in the receiving mode, RF unit 220 processes the analog radio frequency signals received from antennas 205, down-converts the radio frequency to the intermediate frequency, combines and digitizes the signals, etc. In the transmitting mode, RF unit 220 converts digital data to analog, up-converts the data's intermediate frequency to the radio frequency, and sends the data to antennas 205, which transmit the data over the air.

Adaptive Beam Forming (ABF) 230 processes the adaptive coefficient weights associated with a set of antennas used by a switch 110 to communicate with another switch or mobile station. ABF 230 combines the data from various antennas to result in a set of data having adaptive weights for a particular mobile station. ABF 230 also optimizes the signals, and allows a beam to follow a mobile station or another switch. Alternatively, the Space Division Multiple Access (SDMA) protocol may be used with adaptive beam forming techniques. Normally, SDMA is a superset of ABF. ABF 230 may be part of an RF unit 220.

PHY 240, MAC 250, and memory 260 will be explained in detail in FIG. 5. PHY 240 and MAC 250 operate with multiple communication protocols such as the IEEE 802.11a, 802.11b, 802.11g, ultra wide band 802.15.3, CDMA, wide band CDMA, etc.

Processor or CPU 270, when appropriate, executes instructions to perform various functions in system 200 including functions for PHY 240, MAC 250, memory 260, switch controller 280, etc. However, CPU 270 may provide instructions to work with and/or in place of the logic that performs those functions. CPU 270 also provides instructions to move data as appropriate.

Switch controller 280 determines the destination of the data, stores the data in memory, routes the data to appropriate ports to be sent to the destination, etc. For example, if the data is for a mobile station in the same BSS of switch 10, then switch controller 280 sends the data from the receiving path to the transmitting path of switch 110. As a result, the data does not have to travel outside of the switch and then back inside the switch again. In other situations, switch controller 280 sends the data to a network, to another switch, etc. In various approaches, such as those that use access points and the Ethernet switch, the data in many situations travels from the access point to the Ethernet switch and then back to the access point again. Effectively, switch controller 280 eliminates the need to use the Ethernet switch, increases throughput bandwidth, allows full duplex, and enables processing data from multiple mobile stations at the same time.

Flows of Data

Figure 3A:
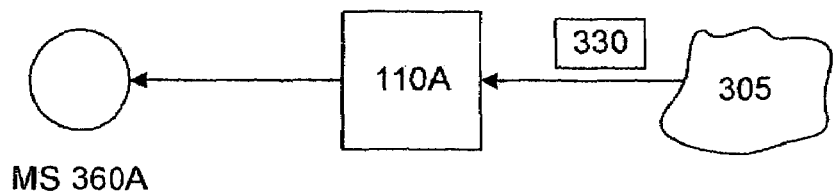
FIG. 3A-3C are used to illustrate how a switch in FIG. 1 routes its received data in accordance with one embodiment.
Figure 3B:
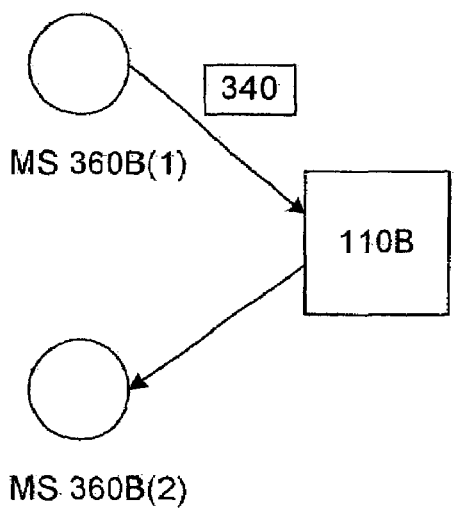
Figure 3C:
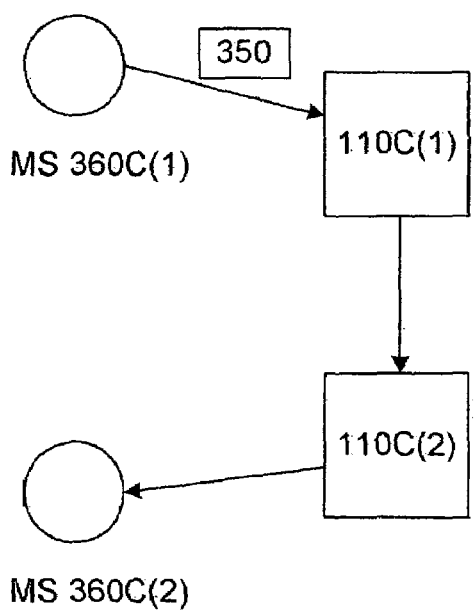

FIGS. 3A-C illustrate how a switch 110 switches or routes data to various mobile stations, in accordance with one embodiment. In FIG. 3A, network 305 sends packet 330 via switch 110A to mobile station 360A, which is in the BSS of switch 110A. Switch 110A thus sends packet 330 directly to mobile station 360A.

In FIG. 3B, mobile stations 360B(1) and 360B(2) are in the same BSS of switch 110B, and mobile station 360B(1) sends packet 340 to mobile station 360B(2). Mobile station 360B(1) thus sends packet 340 to switch 110B, which, via its switch controller, receives packet 340 from the receiving path and sends packet 340 to the transmitting path so that packet 340 does not travel outside of switch 110B.

In FIG. 3C, mobile station 360C(1) is in the BSS of switch 110C(1) while mobile station 360C(2) is in the BSS of switch 110C(2), and mobile station 360C(1) sends packet 350 to mobile station 360C(2). Mobile station 360C(1) thus sends packet 350 to switch 110C(1), which, upon receiving packet 350, sends this packet to switch 110C(2), which then sends packet 350 to mobile station 360C(2). In this example, packet 350 travels directly from switch 110C(1) to switch 110C(2), but may travel through another switch 110 and/or network.

The Signature Group

A signature refers to a feature or characteristic of a mobile station, a beam, etc., in terms of one or a combination of similar geographies, areas, heights, distances, magnitudes of adaptive or coefficient weights, etc. In general, beams are formed by applying coefficient weights to incoming RF signals received from the set of antennas; each beam is associated with a distinct set of weights; and various sets of weights of various beams may have similar features and/or characteristics. Therefore, beams and/or mobile stations having similar characteristics are assigned to a group, and, in one embodiment, the similarity of the sets of weights is used as the signature for that group. As a result, each beam is assigned to a group corresponding to a signature. Further, a group signature is stored in memory and is assigned a weight identification (WID). For example, signature S(1), signature S(2), signature S(3) are assigned WID(1), WID(2), WID(3), etc. When a switch 110 transmits data to a mobile station having a destination address, the switch, based on a signature of the mobile station, generates a beam corresponding to that signature. Mobile stations and switches in different signature groups can concurrently communicate with a particular switch. However, mobile stations in the same signature group are generally scheduled to transfer data to that particular switch at different time frames because multiple beams of the same signature group may cause interference to those mobile stations.

Figure 4:
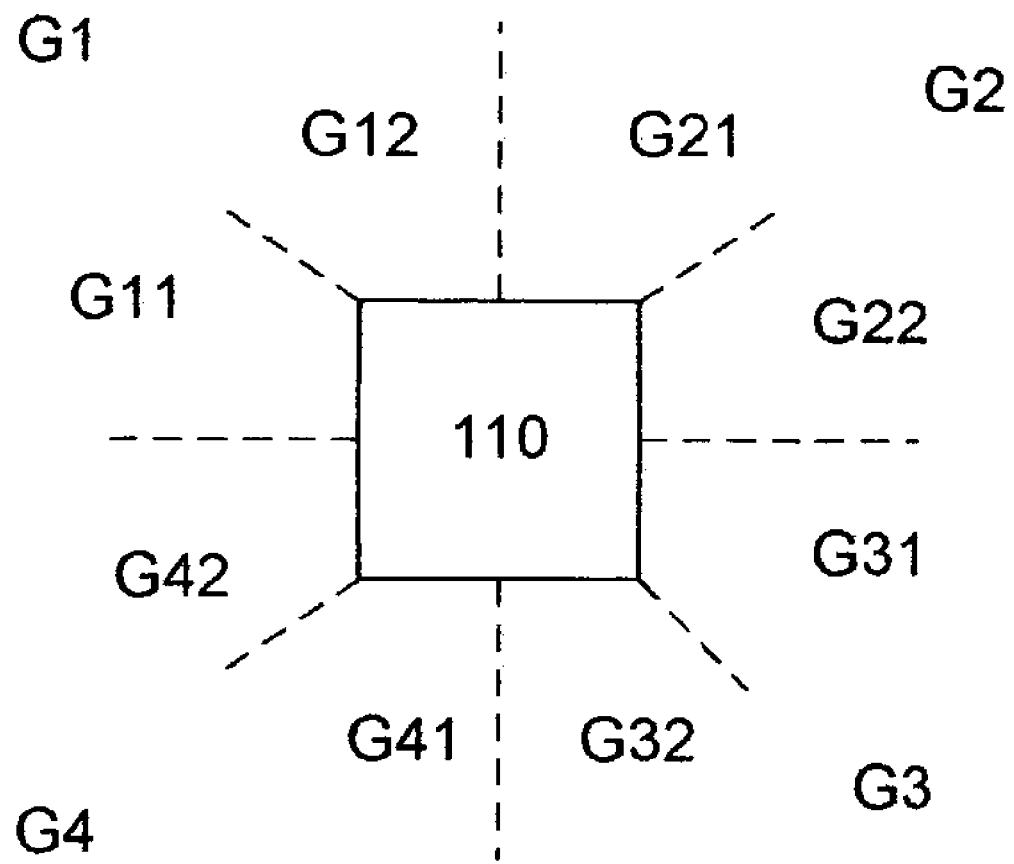
FIG. 4 is used to illustrate using locations as a signature for groups of mobile stations, in accordance with one embodiment.

FIG. 4 is used to illustrate the grouping of mobile stations into four signature groups G1, G2, G3, and G4 based on the location of the mobile stations, in accordance with one embodiment. That is, the location is used as the signature for a group, and a mobile station in the north-west corner, north-east corner, south-east corner, and south-west corner of the switch 110 is assigned to group G1, G2, G3, and G4, respectively. Further, each group G1, G2, G3, and G4 may be divided into subgroups, e.g., G11, G112, G21, G22, G31, G32, G41, G42, etc.

The Switch

Figure 5:
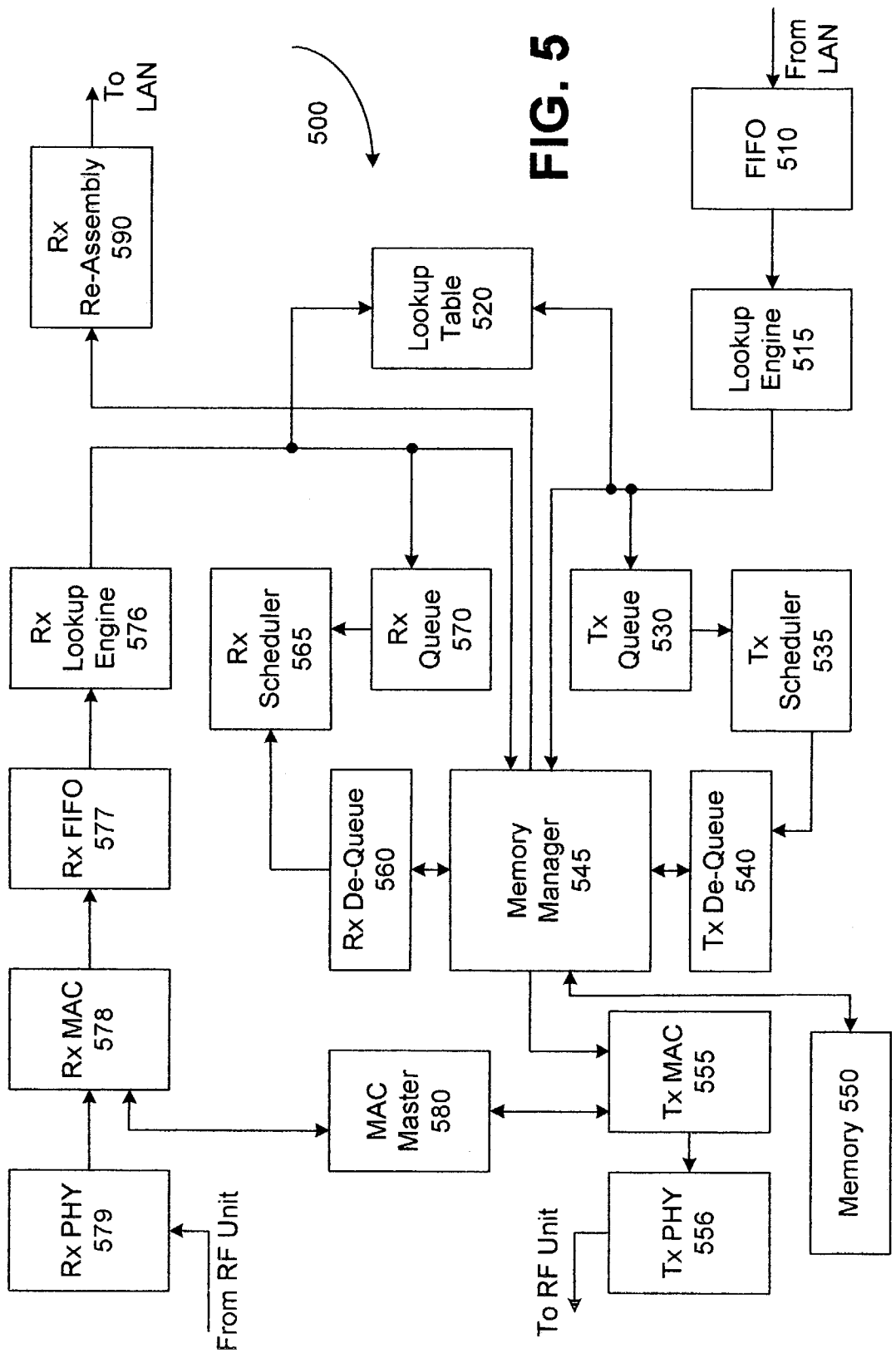
FIG. 5 shows details of a switch in FIG. 1, in accordance with one embodiment.

FIG. 5 shows a switch 500, which is an embodiment of a switch 110. Switch 500 may communicate with multiple mobile stations at the same time, and, in depending on implementations, the data for J number of mobile stations is serialized at a frequency that is J times faster than the frequency for each mobile station. Alternatively, the data may be processed in parallel.

Switch 500 operates in the receiving and transmitting modes, and, generally, the data in the transmitting mode is processed in the reverse order of that in the receiving mode.

Generally, in the receiving mode, the data arrive from switches, mobile stations, networks, etc. Conversely, in the transmitting mode, the data are sent to mobile stations, switches, networks, etc. In one embodiment, switch 500 communicates in the "wireless" domain with mobile stations and switches, and in the "wire" domain with the network. Alternatively, switch 500 may also communicate in the wireless domain with the network. If the data is for a mobile station in the same BSS of switch 500, then, a switch controller, e.g., switch controller 280 in FIG. 2, passes the data from the receiving path to the transmitting path. For illustration purposes in the wireless domain, elements of switch 500 that are associated with the receiving mode carry an identifier "Rx" while elements that are associated with the transmitting mode carry an identifier "Tx." However, functions for the receiving and transmitting mode may be combined and performed by a corresponding element. For example, a scheduler may perform the functions of both the Rx scheduler and Tx scheduler. A queue may be used for both receiving and transmitting, etc. Elements of switch 500 may be implemented in one or a combination of hardware logic, firmware, software, etc.

As compared to FIG. 2, ABF 230, PHY 240, MAC 250, and switch controller 280 are part of switch 500. Further, PHY 240 corresponds to Rx PHY 579 and Tx PHY 556. MAC 250 corresponds to Rx MAC 578, MAC master 580, and Tx MAC 555. Memory 260 corresponds to memory 550. The remaining elements in switch 500 constitute switch controller 280. CPU 270 may control and/or perform functions of elements in switch 500 independently and/or in conjunction with those elements.

For illustration purposes, data communicated through switch 500 is described in terms of packets. The content of a packet is referred to as data content, which, after receiving, is stored in memory 550, and, for transmitting, is taken out of memory 550. Each packet or the data content is associated with a memory tag, normally assigned by memory manager 545. When a packet is scheduled in a queue, e.g., Rx queue or Tx queue, the queue, instead of storing the physical data, stores the tag to reference the packet. Each data packet is also associated with "communication information," including a set of weights, a source address, a weight identification (WID), a signature group identification (SGID), a quality of service (QOS), etc. The set of communication information is also associated with the memory tag of the data content, is stored in lookup table 520, and, based on the memory tag, is combined with the data content as appropriate.

Rx multiple-port PHY 579 includes a signature engine that, based on the signature contained in the data packet, classifies mobile stations into groups, and identifies the signature group of the data. Each signature group is identified by a signature group identification (SGID), and in the embodiment that each signature group is associated with a set of weights, each signature group, when stored in memory 550, is associated with a weight identification (WID). Normally, before a switch 500 communicates with a mobile station, the mobile station sends a request to communicate with that switch. Receiving the signal from the mobile station, Rx PHY 579 adapts to the signal, and assigns a set of adaptive weights for communicating between the mobile station and switch 500.

Generally, in the receiving mode that deals with multiple mobile stations, Rx PHY 579 separates or de-serializes the data into individual data packets for each mobile station running at a frequency slower than that of the combined data. For example, if the data is associated with four mobile stations, then Rx PHY 579 separates the data into four separate sets of data, at a frequency one fourth of the frequency of the combined data. In one embodiment, Rx PHY 579 multiplies the combined data with the set of weights corresponding to the WID of the mobile station to produce the individual sets of data. For example, Rx PHY 579 multiplies the combined data with the set of weights corresponding to the WID associated with mobile station MS(1) to produce the data for mobile station MS(1). Rx PHY 579 multiplies the combined data with the set of weights corresponding to the WfD for mobile station MS(2) to produce the data for mobile station MS(2), etc.

In the receiving mode, Rx PHY 579 converts data received from a RF unit from analog to digital represented by zeros and ones and demodulates the digitized signals. In the transmitting mode, Tx PHY 556 modulates the data and sends it to RF units 220. Rx PHY 579, Tx PHY 556, Rx MAC 578, Tx MAC 555, and MAC master 580 may be considered part of layer one of the communication layer, while the rest of elements in switch 500 may be considered part of layer two of the communication protocol.

Rx multi-port MAC 578 controls the data packets traveling through switch 500. MAC 578 processes the packet header associated with each packet, and, from the header, determines the destination and/or the source addresses of the data packet. The destination address is the address of the device e.g., another switch, a mobile station, etc., that receives the data. The source address is the address of the device that sends the data. MAC 578 considers the content of the data and identifies the corresponding quality of service (QOS) priority. Rx MAC 578, based on the quality of service, assigns a priority to the data packet. The data output from Rx MAC 578 normally contains the signature group and QOS priority. In one embodiment, when the data is serialized, Rx MAC 578 recognizes different sets of data based on the order the sets of data are received. For example, in a sequence of three sets of data, the first set is associated with the first mobile station; the second set is associated with the second mobile station; the third set is associates with the third mobile station, etc. MAC 578 recognizes the data based on that order. Rx MAC 578 also handles encryption and decryption for security purposes. If the mobile station does not have an entry in table 520, then Rx MAC 578 forwards the communication information for the data packet to be stored in lookup table 520.

In the transmitting mode, Tx MAC 555, based on the WID, retrieves the appropriate sets of weights from memory 550 and sends them and the addresses of the data to Tx PHY 556 to be processed accordingly.

Rx FIFO 577 buffers the data packets received from Rx MAC 578 in the first-in first-out mode. Normally, the data packets in FIFO 577 are in transit to memory 550 when switch 500 just receives the packets. When concurrently dealing with multiple mobile stations, multiple sets of data packets are involved, memory manager 545 takes time to determine the location to store each set of data content in memory 550, and therefore FIFO 577 is used to temporarily store the data packets. Other mechanisms for temporarily storing the data may be used in place of a FIFO.

Rx lookup engine 576, based on the packet's destination address, looks up the associated communication information. That is, Rx lookup engine 576 compares the destination address in the data packet against the addresses stored in table 520, which are associated with or in the same BSS of switch 500. The destination address of the data is normally an IP address of a device, e.g., a mobile station, a switch, etc., that eventually receives the data. Based on the destination address, the packet may be transferred outside of switch 500, looped from the receiving path to the transmitting path, be sent to a network, etc. Data outputs of lookup engine 576 include the header and port number, and are used in lookup table 520. Each entry of table 520 corresponds to a mobile station or a switch, and includes communication information. For example, if switch 500 is associated with 10 mobile stations, then there are 10 entries in table 520 each being associated with a set of communication information. If a destination address of the receiving data is not in table 520, then lookup engine 576 creates a new entry in lookup table 520 to include that address. An address not in lookup table 520 indicates that this address is associated with a mobile station that just recently joins the BSS of switch 500. Rx lookup engine 576 also looks up for the appropriate queue, e.g., Rx or Tx queue, and provides the tag for the queue to queue that tag instead of the physical packet data.

Memory manager 545 manages the data in and out of memory 550. Memory manager 545 assigns a memory tag to a data packet. The data content and the communication information normally travel with the memory tag. When desired, the data content and the communication information, based on the memory tag, are combined to form a data packet. Generally, memory manger 545 includes an arbitrator to arbitrate the packets, e.g., determining which packet to be entered or taken out of memory 550. For example, as multiple packets from multiple mobile stations are received, memory manager 545, via its arbitrator, determines which packet enters memory 550 first, second, third, etc. Similarly, multiple packets may be requested to be sent to multiple sets of mobile stations, memory manger 545 determines which packet is to be sent first, etc. As shown in FIG. 5, memory 550 is internal, but could be external, to switch 500.

Rx queue 570 stores requests from mobile stations that desire to send data to switch 500. Rx scheduler 565 regular checks the data in Rx queue 570 to schedule for the mobile stations to send data to switch 500. Tx queue 530 stores data to be sent out of switch 500, e.g., to another switch, a mobile station, a network., etc. When switch 500 receives the data to be sent out, switch 500 stores the data in Tx queue 530. Rx queue 570, like Tx queue 530, uses the memory tag corresponding to a data packet to queue the packets. Rx queue 570 may be part of Rx scheduler 565, and, similarly, Tx queue 530 may be part of Tx scheduler 535.

Rx scheduler 565 may use different methods to send data, such as priority, round robin, first-come first-serve, etc. Scheduler 565 may also change the order of data in queue 570. Normally, scheduler 565 schedules multiple packets for multiple mobile stations to be received at the same time. Scheduler 565 selects the data in Rx queue 570 depending on the priority, quality of service, port number, etc., and sends the headers or queue information to Rx de-queue 560. Rx scheduler 565, recognizing a mobile station seeking to communicate with switch 500, sends appropriate information that is later converted to a beam to that mobile station. If more than one mobile station seeks to communicate with switch 500, then Rx scheduler 565 may concurrently send multiple beams to multiple stations. Rx scheduler 565 sends the request for data to master MAC 580 indicating that data to be sent to the provided destination addresses of the mobile stations.

Rx de-queue 560 gets the information or headers from scheduler 565, lookup table 520, etc. Scheduler 565 sends the information to de-queue 560 and informs dequeue 560 that scheduler 560 desires that a number of packets from memory 550 be sent to Rx re-assembly 590, to another mobile station, a switch, etc. For example, scheduler 565 indicates that the data is to be sent to e.g., four mobile stations. De-queue 560 sends a request to memory manager 545 to send the data. Memory manager 545 combines the header and the data content and forwards the combined data and header to the appropriate mobile stations. Similar to queue 570, de-queue 560 may be part of scheduler 565.

MAC master 580 controls both Rx MAC 578 and Tx MAC 555. MAC master 580 receives requests from Rx MAC 578, Tx MAC 555, etc., and makes appropriate decisions. For example, MAC master 580 determines the priority for the Rx and/or Tx MAC to process their corresponding data. MAC master 580 arbitrates for the data to be transferred concurrently or one after another one. MAC master 580 then communicates its decisions to the appropriate Rx or Tx MAC for them to in turn take appropriate actions. For example, MAC master 580 requests Tx MAC 555 to send data to the mobile station based on the destination address of the data. MAC master 580 controls and thus arbitrates on whether to use the PCF (point coordination function) or DCF mode used in embodiments that use the 802.11 MAC. The DCF is a "contention" mode in which a mobile station or a switch 500 contends for a slot in the medium for transferring data.

FIFO 510 and lookup engine 515 serve similar function as Rx FIFO 577 and Rx lookup engine 576 for data received form a network.

Rx re-assembly 590 reassembles the data into the appropriate format to be sent to the network, e.g., the LAN, the Ethernet, the ADSL, etc.

Lookup Table

FIG. 6 shows a table 600 being an example of lookup table 520, in accordance with one embodiment. Table 600 includes five columns including destination address, port number, quality of service, signature group, and weight identification. Normally, the address is included inside the data packet, and could be an IP address of the mobile station to receive the data. Each mobile station communicating with a switch 110 is assigned to a port having a port number. Multiple mobile stations may be associated with one port because a port is virtual. However, if two mobile stations share one port, then, generally, they do not transmit/receive at the same time. Quality of service indicates the type of data, e.g., whether the data is voice, data, multimedia, etc. Each type of data is associated with a priority corresponding to the order for the data to be transmitted. For example, voice may be sent-prior to data; data may be sent prior to multimedia, etc.

For illustration purposes, in table 600, mobile stations MS(1), MS(2), and MS(3) correspond to destination address 0001, 0010, 0011, respectively. To communicate with a switch 110, those mobile stations use port 2, port 3, and port 1, respectively. Their corresponding quality of services are voice, data, multi-media, their corresponding signatures are S1, S2, S3, and their corresponding weight identification are W1, W2, W3, etc. Table 600 is a learning table, i.e., over the time, new entries are added to or deleted from the table.

The Port

A switch 110 includes switch-to-station ports, switch-to-switch ports, switch-to-network ports, and "general" ports. Switch-to-station ports allow communications between switch 110 and mobile stations normally in the same BSS of that switch 10. Switch-to-switch ports allow communications between switch 110 and other switches, switch-to-network ports allow communications between switch 110 and networks such as a LAN, Ethernet, DSL, etc. General ports are connected to interfaces such PCI interface, serial interface, etc., and allow communications between switch 110 and devices compliant with the interface protocols.

A port, together with a beam, may be used for both receiving and transmitting data. A port, when used for receiving data, may be referred to as a receiving port while the same port, when used for transmitting data, may be referred to as a transmitting port. Generally, a receiving port is associated with a set of receiving antennas, and a transmitting port is associated with a set of transmitting antennas. The receiving and transmitting antennas are part of a plurality of antennas of a smart antenna system.

A switch 110, via a switch-to-station port and a beam, communicates with a mobile station. For example, if four beams cover four mobile stations, then the four beams are associated with four mobile stations, one for each station. At various times, a switch 110 may use different switch-to-station ports to communicate with the same mobile station.

The Queue

A data transaction traveling through switch 500 includes a plurality of packets each of which is normally transmitted at different times and may have a QOS priority different than that of another packet. In one embodiment, a queue, Rx queue or Tx queue, includes a plurality of sub-queues each of which is for a priority level. For example, sub-queue SQ1 stores packets having the highest priority, e.g., priority 1, sub-queue SQ2 stores packets having priority 2, sub-queue SQ3 stores packets having priority 3, etc. Further, the scheduler schedules the data in each sub-queue SQ1, SQ2, SQ3, etc., for all sub-queues and then returns to sub-queues SQ1, SQ2, SQ3, etc. For example, Tx queue 530 includes 3 sub-queues SQ1, SQ2, and SQ3, and each time 4 packets are sent to four mobile stations. In one embodiment, the first four packets are taken from subqueues SQ1, SQ2, and SQ3 at time t1, t2, and t3, respectively, and then the second four packets are taken from sub-queues SQ1, SQ2, and SQ3 at time t4, t5, and t6, respectively, etc. Further, the four packets that are transmitted at a time, e.g., t1, t2, t3, etc., are from different signature groups.

Transferring Data To and From a Switch

Figure 7:
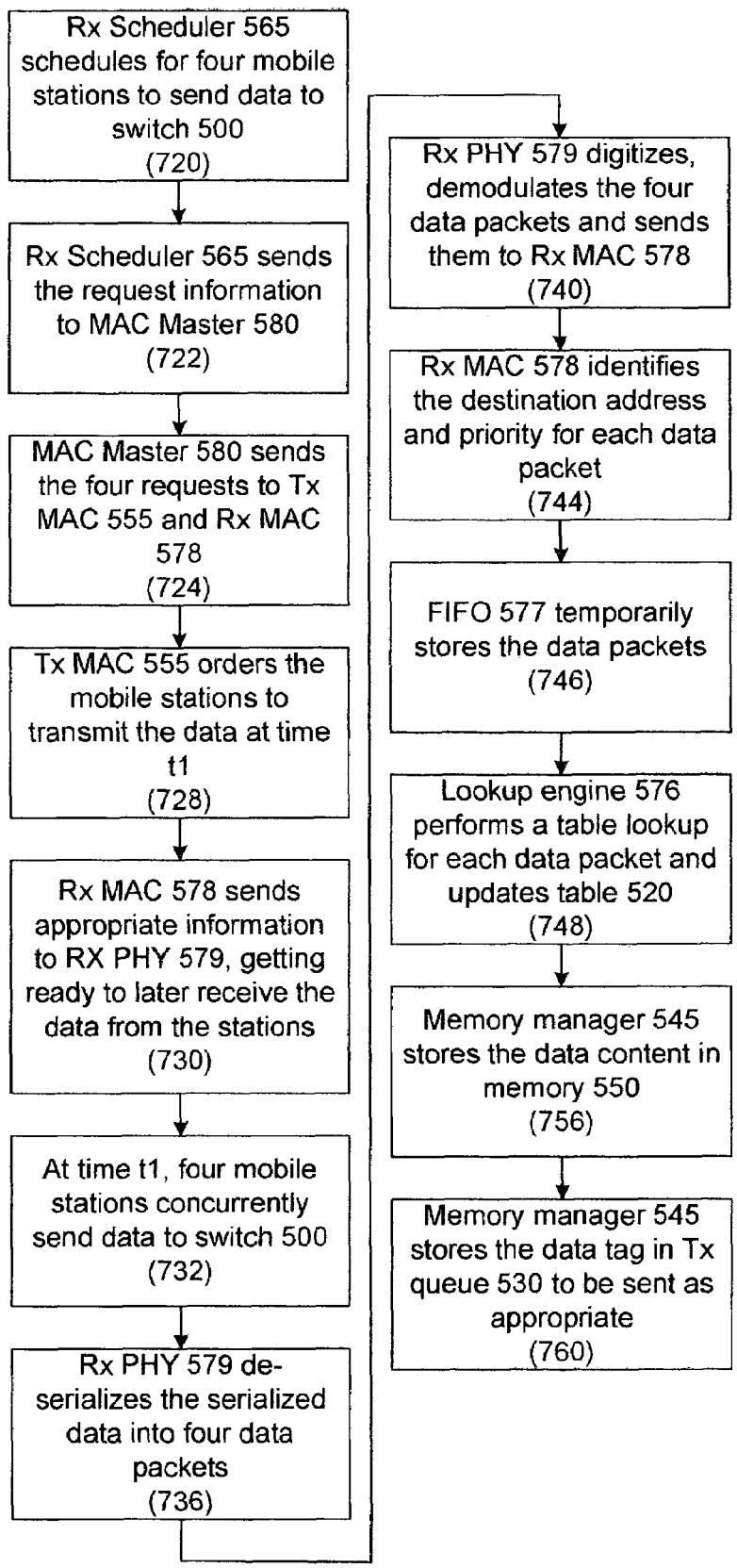
FIG. 7 shows a flowchart illustrating steps for four mobile stations to send data to a switch, in accordance with one embodiment.

FIG. 7 shows a flowchart illustrating how four mobile stations, e.g., MS(1) to MS(4) send data to switch 500. For illustration purposes, these four mobile stations belong to four different signature groups so that these mobile stations can concurrently send data to switch 500. Further, the data related to these stations have been stored in lookup table 520, and include the corresponding source address, port, weight identification, signature group identification of each mobile station, etc.

In step 720, Rx scheduler 565 schedules for four mobile stations MS(1) to MS(4) to send data to switch 500, e.g., at time t1. Alternatively, scheduler 565 may specify various times, such as t1', t2', t3', and t4' for mobile stations MS(1), MS(2), MS(3), and MS(4), respectively. Scheduler 565 also assigns port numbers for both receiving and transmitting.

In step 722, Rx scheduler 565 thus sends the request information to MAC master 580.

In step 724, MAC master 580 sends four requests to Tx MAC 555 including identifications of the four mobile station MS(1) to MS(4) so that at time ti the four mobile stations concurrently send their data to switch 500. MAC master 580 also sends the four requests to Rx MAC 578 so that Rx MAC 578 takes appropriate actions to receive the data at time t1. Additionally, MAC master 580 coordinates the PCF and DCF modes for the transmitting and receiving operations.

In step 728, Tx MAC 555, based on the identification of the mobile stations and through Tx PHY 556, sends the data to the four mobile stations and orders them to transmit data to switch 500 at the specified time t1. In an embodiment, Tx MAC 555 broadcasts the information to all mobile stations in the BSS of switch 500, not just the four mobile stations MS(1) to MS(4).

In the meantime, Rx MAC 578, in step 730, sends the four requests with the weight identifications of the four mobile stations to Rx PHY 579 so that Rx PHY 579 can retrieve the weights corresponding to the four mobile stations from memory 550. These sets of weights are stored in Rx PHY 579 to get ready for receiving the data at time t1, from the four mobile stations MS(1) to MS(4).

In step 732, at time t1, four mobile station MS(1) to MS(4) concurrently send four data packets to switch 500.

For illustration purposes, the RF units serialized the four sets of data before sending them to Rx PHY 579. As a result, Rx PHY 579, in step 736, de-serializes the serialized data to generate four separate data packets.

In step 740, Rx PHY 579 digitizes, demodulates, etc., the four data packets, and sends them to Rx MAC 578.

In step 744 Rx MAC 578 processes the four data packets. MAC 578, from the destination address field of a data packet, identifies the destination address for each packet. This information is used to update lookup table 520. Rx MAC 578 also determines the priority of the packet based on the quality of service. If the quality of service does not include the priority, then Rx MAC 578 determines the priority based on the type of data such as voice, data or video, etc.

For illustration purposes, memory 550 is busy and thus cannot immediately store the data. FIFO 577 thus, in step 746 temporarily stores the four data packets.

In step 748, lookup engine 576 performs a table lookup for each data packet. Because, as indicated above, the communication information for these four mobile stations has been stored in lookup table 520, lookup engine 576 finds the information associated with the four mobile stations MS(1) to MS(4), and therefore updates lookup table 520 as appropriate.

In step 756, memory manager 545 assigns a memory tag to the data packets, and, based on this memory tag, stores the four data content in memory 550.

Memory manager 545, in step 760, also stores the tag for each packet in Tx queue 530 so that Tx scheduler 535 may schedule to send the data. As indicated above, the data tag is used to combine the data content and communication information as appropriate. Depending on the destination of the data packet, memory manager transmit a packet to a network port, a switch-to-switch port, a switch-to-mobile station port, etc., to be sent to appropriate destinations such as another switch, mobile station, or to re-assembly 590 to be sent to the network, etc.

Instead of scheduling four mobile stations to send data at a particular time, e.g., time t1, Rx scheduler 565 may schedule mobile stations to send data at various times such as times t1, t2, t3, t4, etc.

Figure 8:
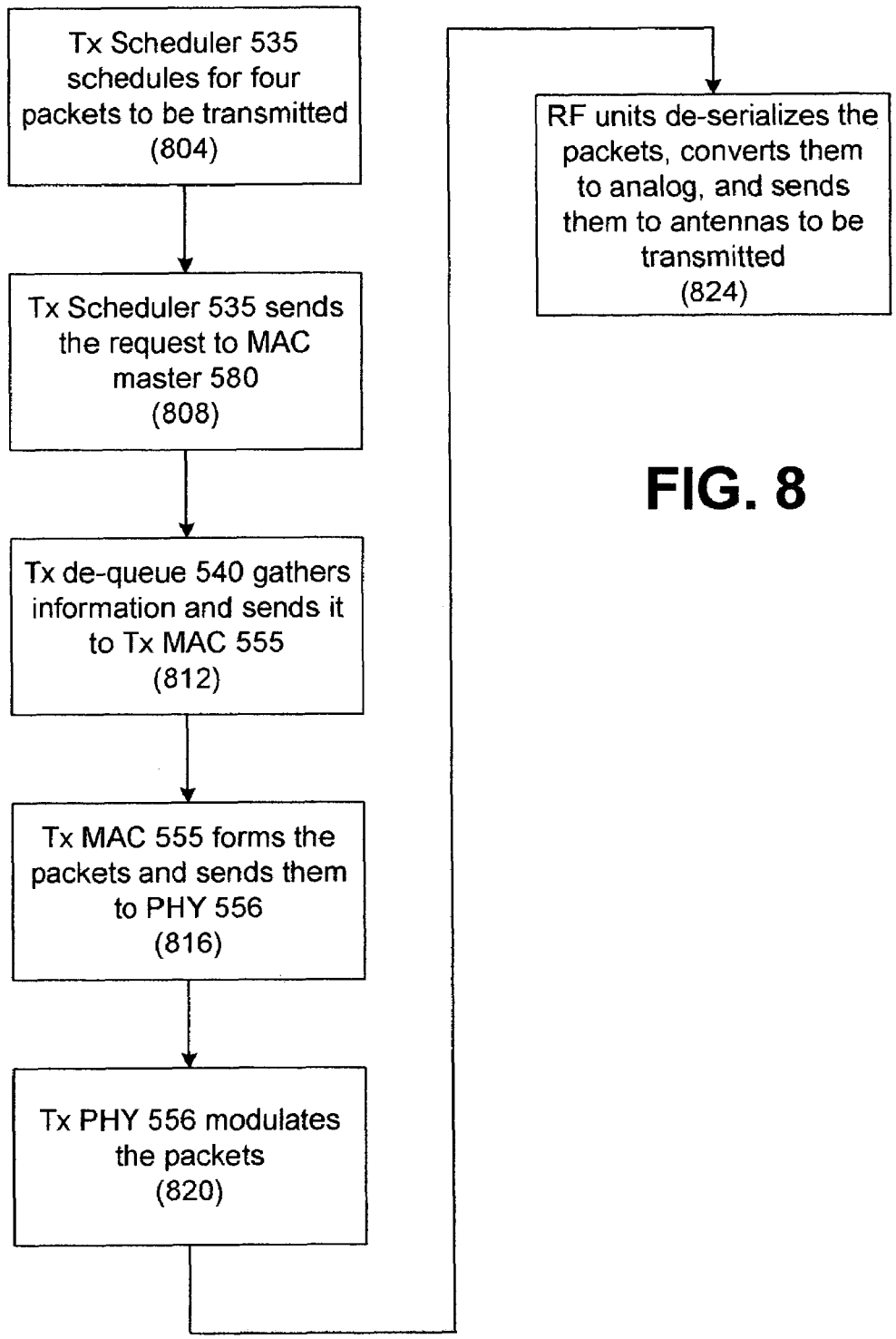
FIG. 8 shows a flowchart illustrating steps for transmitting four packets to four mobile stations.

FIG. 8 shows a flowchart illustrating the steps in transmitting four data packets to four mobile stations MS(5) to M(8) at time t5, in accordance with one embodiment. For illustration purposes, the four packets have been stored in Tx queue 530, after the steps in FIG. 7.

In step 804, Tx scheduler 535 schedules for four packets to be sent. Tx scheduler 535 selects the four packets for 4 mobile stations MS(5) to MS(8) that have highest priority. In one embodiment, these four packets are stored in sub-queue SQ1 of Tx queue 530 and are in different signature groups.

In step 808, Tx scheduler 535 sends the request to MAC master 580, and for illustration purposes, there is no other request to be sent at time t5. As a result, MAC master 580 approves the request and so informs Tx MAC 555. If there is a time conflict, then MAC master 580 and Tx scheduler 535 work together to determine the time.

In the mean time, in step 812, Tx de-queue 540 gathers the data to form the packets, including the data content from memory 550, the communication information in lookup table 520, etc., and sends them to Tx MAC 555.

In step 816, Tx MAC 555 forms the packets and transmits them to Tx PHY 556.

In step 820, Tx PHY 556 modulates the packets to form the four transmitting beams and serializes the four packets as appropriate and sends them to the RF units including the ports or port numbers assigned by Tx scheduler 535.

In step 824, the RF units de-serializes the four packets, converts the digital data to analog, up converts the data to the radio frequency, and sends the data to antennas, which transmit the data over the air.

The above steps are then repeated to send the next four packets in sub-queue SQ2, SQ3, SQ4, etc.

BENEFITS OF EMBODIMENTS OF THE INVENTION

Embodiments of the invention can perform duplex because a switch 110 includes a Rx MAC 578 and a Tx MAC 555 that work independent of one another and thus can simultaneously receive and transmit data. Using a switch 110 to communicate with another switch 110 eliminates the need of an Ethernet switch that is commonly found in other approaches using the 802.01 protocol and that connects the access point and the network. In effect, a switch 110 may serve as an Ethernet switch, but does not require physical lines like the Ethernet switch.

Embodiments of the invention allow coverage ranges better than other approaches because the beams can focus to a particular object such as another switch or a mobile station. Signals in embodiments of the invention can travel through walls better, provide higher data rate, higher capacity and bandwidth because embodiments of the invention allow the use of smart antennas and/or adaptive beam forming that allow beam focus and thus enable signals going through walls/objects better.

Capacity and bandwidth may be expressed in terms of the number of mobile stations. Bandwidth is expressed as the total bandwidth at the gateway, e. g., the sum of all bandwidth measurements from all switches in a system. Data transferring at the same time between a switch 110 and a network also increases the bandwidth.

In the foregoing, the invention has been described with reference to various embodiments. However, those skilled in the art will recognize that the invention is not limited to those embodiments. Variations and modifications may be made without departing from the scope of the invention, and the specification including the drawings is to be regarded as illustrative rather than as restrictive.

What is claimed is:

1. A wireless communication system comprising:
a plurality of switches including a first switch, a second switch, and a third switch wherein
via a first switch-to-switch beam, the first switch wirelessly communicates with the third switch;
via a second switch-to-switch beam, the second switch wirelessly communicates with the third switch;
via switch-to-station beams,
a first set of mobile stations wirelessly communicates with the first switch; and
a second set of mobile stations wireless communicates with the second switch;
wherein the data of each mobile station of K mobile stations that is processed by a switch runs at a first frequency, and the serialized data of the K mobile stations from switch to switch runs a second frequency that is K times faster than the first frequency.

2. The system of claim 1 wherein the third switch communicates with a network.

3. The system of claim 2 wherein: a mobile station in the first set of mobile stations communicates with the network via the first switch and the third switch; a mobile station in the second set of mobile stations communicates with the network via the second switch and the third switch; and the first switch and the second switch communicate with the network via the third switch.

4. The system of claim 1 wherein a first mobile station and a second mobile station in the first set of mobile stations concurrently communicate with the first switch.

5. The system of claim 4 wherein the first mobile station is associated with a first signature distinguishable from a second signature associated with the second mobile station.

6. The system in claim 1 wherein a first mobile station in the first set of mobile station transmits data to the first switch and a second mobile station in the first set of mobile station receives data from the first switch, transmitting data to the first switch uses a first beam distinguishable from a second beam used in receiving data from the first switch; transmitting and receiving are concurrently performed.

7. The system of claim 1 wherein the third switch is configured as a master switch while the first switch and the second switch are configured as slave switches to the master switch; the first switch and the second switch communicate with one another via the third switch.

8. The system of claim 1 wherein a mobile station in the first set of mobile stations communicates with the first switch; a mobile station in the second set of mobile stations communicates with the second switch; and the first switch and the second switch communicate via the third switch.

9. The system of claim 1 wherein a switch of the plurality of switches includes a lookup table that stores a signature associated with a mobile station communicating with the switch of the plurality of switches.

10. The system of claim 1 wherein a switch of the plurality of switches includes a lookup table that stores an identification of a set of weights associated with a signature; the weight is for use by a beam; the signature is associated with a mobile station communicating with the switch of the plurality of switches.

11. The system of claim 1 wherein a switch of the plurality of switches schedules transferring of a data packet based on a priority of the data packet.

12. The system of claim 1 wherein when scheduling to concurrently transfer a first data packet and a second data packet, the second data packet is selected from a second signature group distinguishable from a first signature group associated with the first data packet.

13. The system of claim 1 wherein: a switch of the plurality of switches includes a queue having a plurality of sub-queues each of which stores data of the same priority, and when a first data packet and a second data packet are taken out of the queue for a transmitting transaction, the first data packet is associated with a first signature distinguishable from a second signature associated with the second data packet.

* * * * *